United States Patent
Lagercrantz

(10) Patent No.: US 8,861,521 B2
(45) Date of Patent: Oct. 14, 2014

(54) MULTICASTING IN AN ONLINE GAMING SYSTEM

(75) Inventor: Henrik Lagercrantz, Uppsala (SE)

(73) Assignee: ElectraWorks Limited, Gibraltar (GI)

( * ) Notice: Subject to any disclaimer, the term of this patent is extended or adjusted under 35 U.S.C. 154(b) by 171 days.

(21) Appl. No.: 13/376,293

(22) PCT Filed: Jun. 8, 2009

(86) PCT No.: PCT/SE2009/050688
§ 371 (c)(1),
(2), (4) Date: Dec. 5, 2011

(87) PCT Pub. No.: WO2010/144000
PCT Pub. Date: Dec. 16, 2010

(65) Prior Publication Data
US 2012/0077600 A1 Mar. 29, 2012

(51) Int. Cl.
- *H04L 12/28* (2006.01)
- *H04L 29/06* (2006.01)
- *H04L 12/18* (2006.01)
- *H04L 29/08* (2006.01)

(52) U.S. Cl.
CPC .............. *H04L 12/185* (2013.01); *H04L 67/38* (2013.01); *H04L 67/1019* (2013.01); *A63F 2300/556* (2013.01); *A63F 2300/513* (2013.01); *H04L 67/1002* (2013.01); *H04L 67/1017* (2013.01)
USPC ......................................................... 370/390

(58) Field of Classification Search
USPC .......................... 370/389, 390, 428, 400, 432
See application file for complete search history.

(56) References Cited

U.S. PATENT DOCUMENTS

| 6,684,331 B1 | 1/2004 | Srivastava |
| 8,260,894 B2 * | 9/2012 | Chun ............................ 709/223 |

(Continued)

FOREIGN PATENT DOCUMENTS

| EP | 1 063 814 | 12/2000 |
| EP | 1 093 250 | 4/2001 |

(Continued)

OTHER PUBLICATIONS

International Search Report for PCT/SE2009/050688, mailed Mar. 4, 2010.
International Preliminary Report on Patentability with 1 Amended Sheet, dated Mar. 23, 2011.
Ooms, D. et al., "Connectionless Multicast", draft-ooms-cl-multicast-00.txt, Internet Draft, (Jun. 2009), 12 pages.

(Continued)

*Primary Examiner* — Anh Ngoc Nguyen
(74) *Attorney, Agent, or Firm* — Nixon & Vanderhye P.C.

(57) ABSTRACT

An online gaming multicast service system includes a set of interconnected multicast managers (MM1, MM2, MM3) for receiving messages from game servers (GS1, GS2) to end-users (A-H). Each message and an associated end-user recipient list ({B,E,F}, {A,G,H}) is received by one of the multicast managers. The multicast service system further includes a set of multicast servers (MS1, MS2, MS3), one multicast server being connected to each multicast manager, for distributing each message to all end-users in the associated end-user recipient list. Each multicast manager includes means for determining which recipients in an end-user recipient list associated with a message are connected to which multicast server and for dividing the end-user recipient list into corresponding end-user recipient sub-lists. Each multicast manager also includes means for forwarding the message and non-empty end-user recipient sub-lists to the respective multicast servers for further distribution of the message to the end-users in each non-empty end-user recipient sub-list.

4 Claims, 5 Drawing Sheets

(56) References Cited

U.S. PATENT DOCUMENTS

| | | | |
|---|---|---|---|
| 2004/0225733 A1* | 11/2004 | Tesink et al. | 709/225 |
| 2005/0135401 A1* | 6/2005 | Schmidt | 370/432 |
| 2008/0268929 A1 | 10/2008 | Billmaier et al. | |

FOREIGN PATENT DOCUMENTS

| | | |
|---|---|---|
| WO | WO 02/41577 | 5/2002 |
| WO | WO 2006/065101 | 6/2006 |

OTHER PUBLICATIONS

Supplementary European Search Report dated Feb. 4, 2014 in European Application No. EP 09 84 5903.

Bauer et al., "Network Infrastructure for Massively Distributed Games", Proceedings of the 1st Workshop on Network & Support for Games 2002—Netgames 2002, Apr. 16, 2002, pp. 36-43, XP002491978.

Aarhus et al., "Generalized Two-Tier Relevance Filtering of Computer Game Update Events", ACM, Apr. 17, 2002, pp. 10-13, XP040138079.

* cited by examiner

MULTICASTING IN AN ONLINE GAMING SYSTEM

This application is the U.S. national phase of International Application No. PCT/SE2009/050688, filed 8 Jun. 2009, which designated the U.S., the entire contents of which is hereby incorporated by reference.

TECHNICAL FIELD

The present invention relates generally to online gaming systems, and especially to multicasting in such systems.

BACKGROUND

Some events taking place in an online gaming system should be multicast to a large group of end-users connected to the system. For example, a notification about the start of a tournament should be sent out to all the end-users registered to participate. Traditionally, this type of distribution mechanism is implemented directly inside the game servers. This solution, however, limits the ability to scale efficiently as the number of end-users grows. The main reason for this is that all end-users that should receive the event notification must somehow be connected to the single game server where the event was triggered. Since the capacity of a single game server is limited, there is an upper bound on the number of end-users that a game server can manage to multicast to.

The multicast problem is similar to the scalability problem that arises when trying to broadcast large amounts of data to many end-users in real time, e.g. live streaming on the internet. The main difference is that multicast, as opposed to broadcast, is directed to a specific set of end-users. The game servers must distinguish between different end-users and determine which ones that should receive a specific message. Simply broadcasting everything to everybody is not an option here, since this would violate security principles of sensitive data. It would also generate unnecessary data traffic which increases the operating costs.

Another drawback of the described traditional multicast mechanism is that it is part of the gaming domain, i.e. the logical group of applications that manage game related logic. However, the gaming domain should be kept as clean as possible and optimized for its purpose—to manage game states and uphold the game rules. By connecting end-users directly to the game server for multicast purposes, the game server responsibility is stretched outside the gaming domain. The game logic must then also consider details about end-user connections that are of no relevance to the game itself. The mix of multicast connection logic and game logic does not only increase the complexity of the game servers, it also limits the performance of each game server. An application can typically be optimized for efficient IO throughput or for efficient rule processing—but not for both. The mix implies a trade-off where the game servers need to sacrifice game rule processing performance to handle large numbers of end-user multicast connections.

SUMMARY

An object of the present invention is to provide more efficient multicasting in an online gaming system.

This object is achieved in accordance with the attached claims.

Briefly, an online gaming multicast service system in accordance with the present invention includes a set of interconnected multicast managers for receiving messages from game servers to end-users. Each message and an associated end-user recipient list are received by one of the multicast managers. The multicast service system further includes a set of multicast servers, one multicast server being connected to each multicast manager, for distributing each message to all end-users in the associated end-user recipient list. Each multicast manager includes means for determining which recipients in an end-user recipient list associated with a message are connected to which multicast server and for dividing the end-user recipient list into corresponding end-user recipient sub-lists. Each multicast manager also includes means for forwarding the message and non-empty end-user recipient sub-lists to the respective multicast servers for further distribution of the message to the end-users in each non-empty end-user recipient sub-list.

BRIEF DESCRIPTION OF THE DRAWING

The invention, together with further objects and advantages thereof, may best be understood by making reference to the following description taken together with the accompanying drawings, in which.

DETAILED DESCRIPTION

In the following description the same reference designations will sometimes be used for elements having the same or similar functions.

Furthermore, in the figures of the following description connections between different entities are illustrated as separate logical connections. However, in reality the actual connections may be multiplexed on fewer inputs and outputs.

Figure 1:
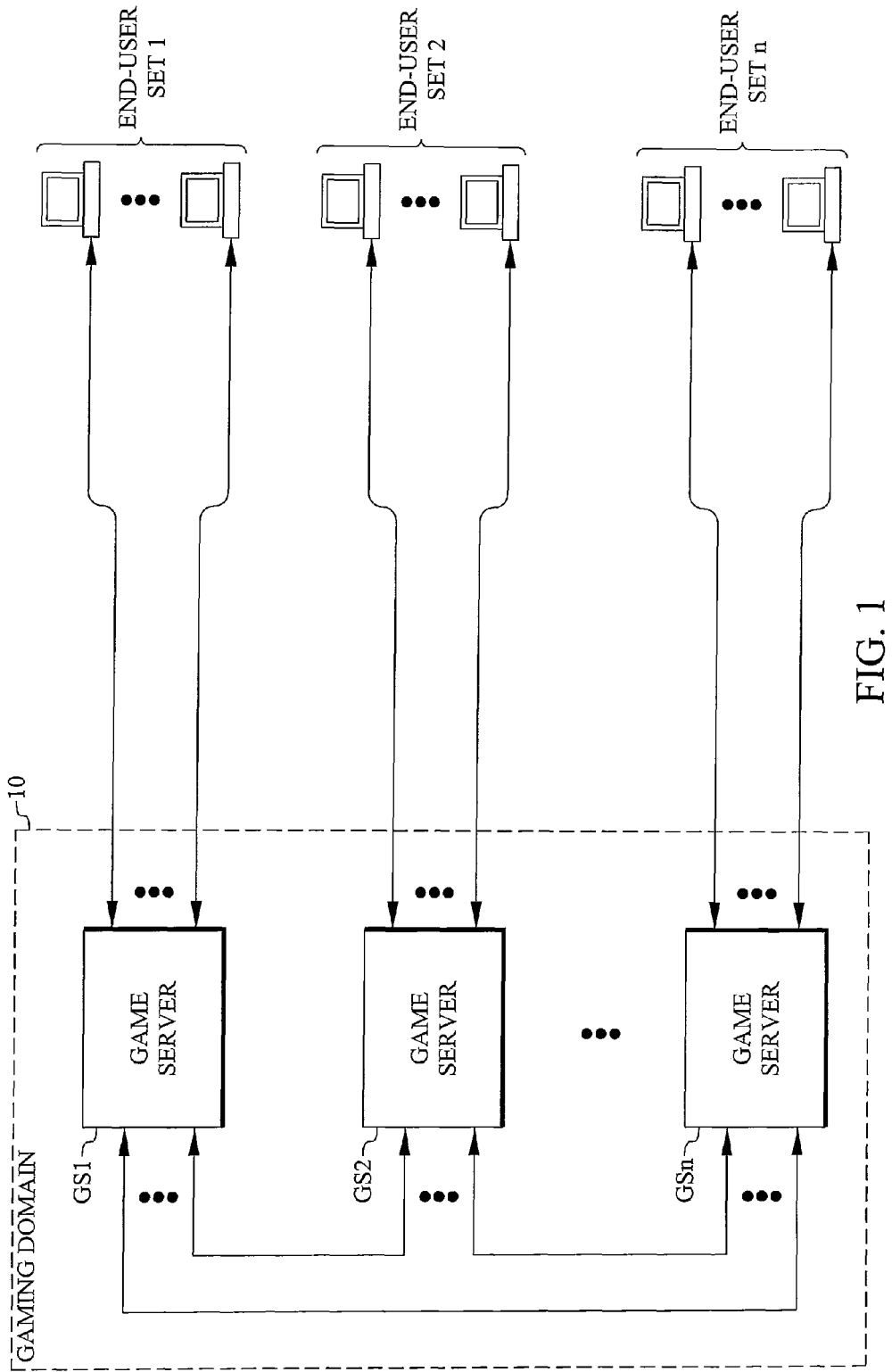
FIG. 1 is a block diagram illustrating traditional multicasting in an online gaming system.

FIG. 1 is a block diagram illustrating traditional multicasting in an online gaming system. A gaming domain 10 includes a number of game servers GS1, GS2, . . . , GSn. A typical gaming domain will include 3-7 game servers. Each game server is connected to a corresponding end-user set 1, 2, . . . , n. A typical end-user set may include 5000-15000 end-users. The union of all these sets form the gaming domain end-user set. During gaming sessions the game servers use these connections for individual communication with the end-users. It is to be noted that a specific game may involve end-users spread over several game servers (This is handled by interconnecting the game servers, as illustrated in FIG. 1.). However, the same connections are also used for multicasting messages to subsets of the gaming domain end-user set. The multicasting is managed by the game servers themselves, and typically involves several game servers, since an event triggering a message occurs on one game server and the end-users intended to receive the message may be spread over several game servers.

Figure 2:
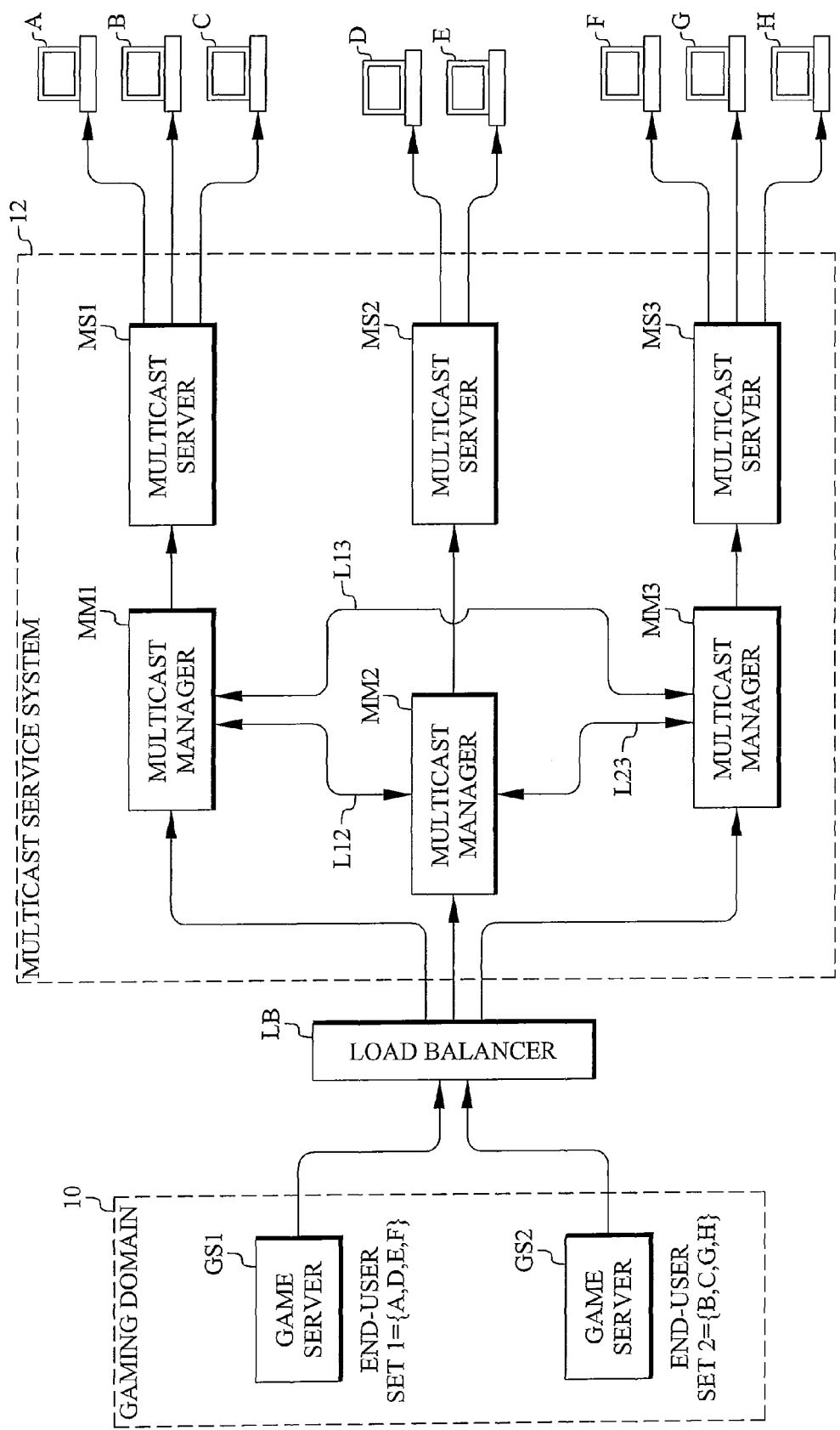
FIG. 2 is a block diagram illustrating multicasting in an online gaming system in accordance with an embodiment of the present invention.

FIG. 2 is a block diagram illustrating multicasting in an online gaming system in accordance with an embodiment of the present invention. To avoid cluttering of the figure, only two game servers GS1, GS2 and a few end-users A-H have been drawn. However, as indicated above, the actual numbers (especially the number of end-users) are typically larger. The end-users are connected to the game servers for individual communication as in FIG. 1 for gaming, but message multicasting will be handled by a separate system, as will be described below. In the example, game server GS1 is assumed to manage the end-user set {A,D,E,F} and game server GS2 is assumed to manage end-user set {B,C,G,H}. These "gaming connections" are not shown to avoid cluttering of the figure. The interconnection between the game servers has been omitted for the same reason.

In the embodiment illustrated in FIG. 2, messages from game servers GS1, GS2 are not sent separately to each end-user recipient, as in FIG. 1. Instead they are sent only once to a multicast service system 12, which distributes them to each end-user recipient. This multicast service system includes a number of interconnected multicast managers MM1, MM2, MM3 receiving multicast messages, which are forwarded to multicast servers MS1, MS2, MS3, one for each multicast manager, which distribute them to the end-user recipient. When a multicast message is sent from one of the game servers GS1, GS2, it is received by one of the multicast managers MM1, MM2, MM3. This multicast manager will transfer the message to its associated multicast server for distribution to the end-user recipient connected to it. The end-user recipient that are not connected to this multicast server will be reached by sending the message to other multicast managers over the appropriate inter-connection lines L12, L13, L23 for further distribution on the other multicast servers to the remaining end-user recipient. This process will be illustrated with reference to FIGS. 3 and 4.

In a preferred embodiment a load balancer LB is provided between the game servers and the multicast managers. The purpose of the load balancer is to avoid overloading of one of the multicast managers. In the example the load balancer may cycle through the multicast managers by sending a first message from one of the game servers to multicast manager MM1, a second message from one of the game servers to multicast manager MM2, a third message from one of the game servers to multicast manager MM3, and repeat this pattern for subsequent messages. Another possibility is to randomly send ⅓ (in average) of the received messages to each multicast manager.

Figure 3:
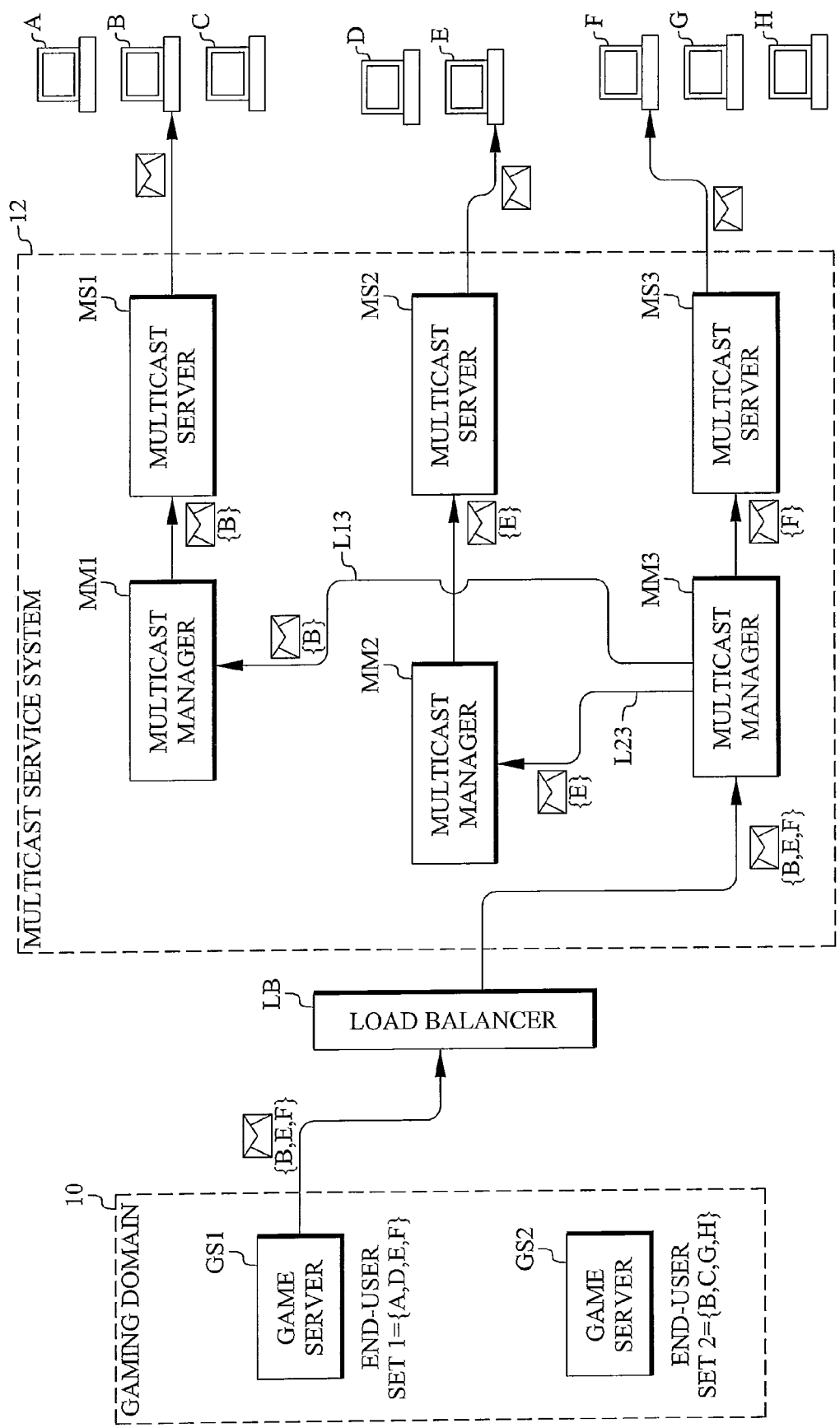
FIG. 3 is a block diagram illustrating multicasting of a specific message in the online gaming system of FIG. 2.

FIG. 3 is a block diagram illustrating multicasting of a specific message in the online gaming system of FIG. 2. In this example game server GS1 sends a message (represented by the envelope) to the end-user set {B,E,F}. This is accomplished by sending the actual message and an end-user recipient list {B,E,F} associated with this message to the multicast service system 12. It is noted that end-user B is included in this list, although this end-user is actually managed by game server GS2. Thus, in this case the game associated with this message is spread over several servers, as described above. Although game server GS1 does not manage end-user B, it may still include it in the end-user recipient list associated with the message.

The message with its end-user recipient list is received by one of the multicast managers, MM3 in the example, preferably after passing through load balancer LB, which selects which multicast manager to use. The multicast manager MM3 processes the end-user recipient list associated with the message to determine which end-user is associated with which multicast manager (or server, since they are paired together). In this case end-user F is associated with multicast manager MM3. Thus, multicast manager MM3 sends the message as well as an end-user recipient sub-list {F} to multicast server MS3, which sends the message to end-user F. The multicast manager MM3 also sends the message and an end-user recipient sub-list {B} to multicast manager MM1 on interconnecting line L13, which forwards this information to multicast server MS1, which in turn sends the message to end-user B. Similarly, multicast manager MM3 sends the message and an end-user recipient sub-list {E} to multicast manager MM2 on interconnecting line L23, which forwards the information to multicast server MS2, which in turn sends the message to end-user E.

Figure 4:
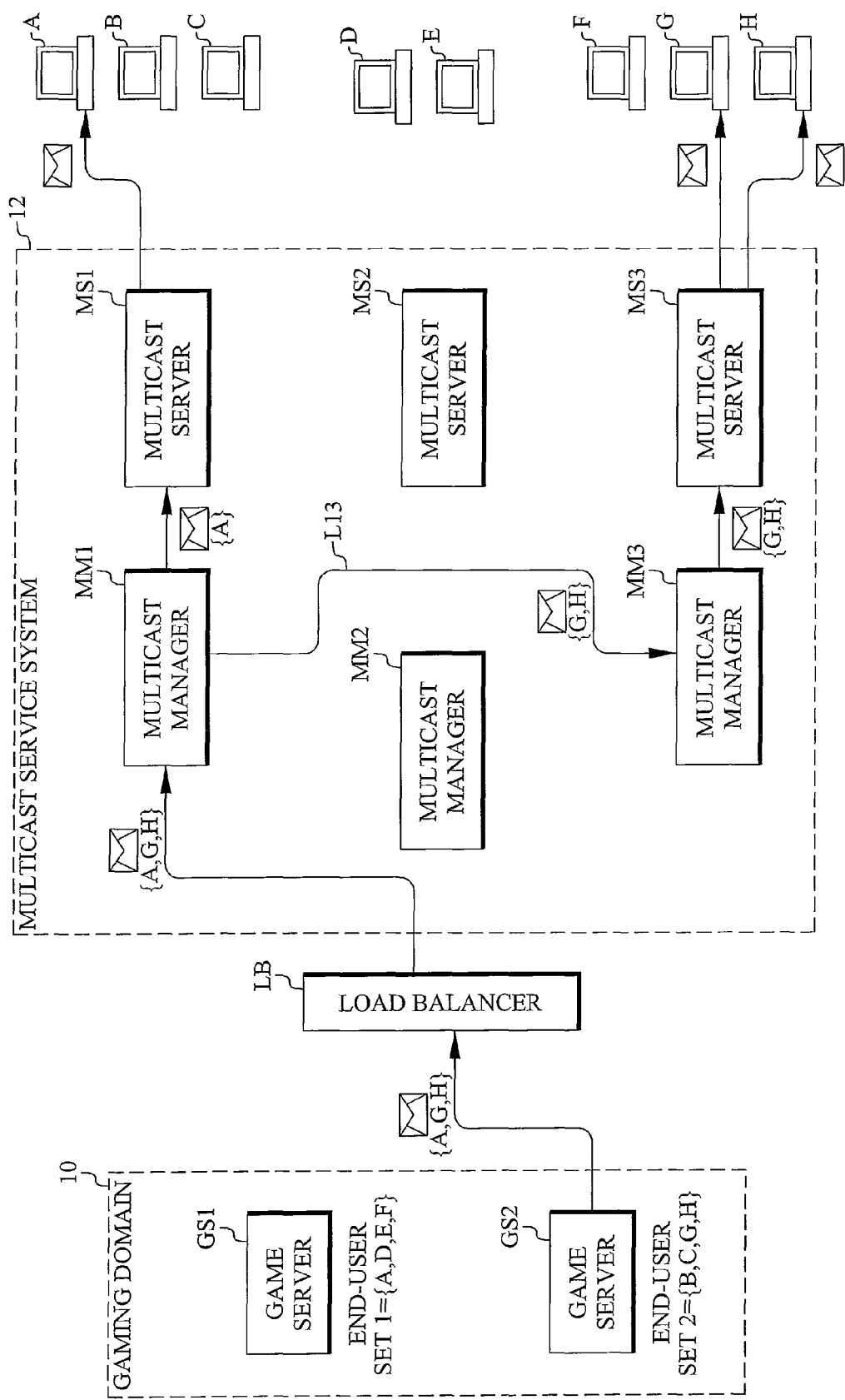
FIG. 4 is a block diagram illustrating multicasting of another specific message in the online gaming system of FIG. 2.

FIG. 4 is a block diagram illustrating multicasting of another specific message in the online gaming system of FIG. 2. In this case game server GS2 sends a message to the end-user set {A,G,H} over multicast manager M1. Multicast manager MM1 processes the end-user recipient list of the message to determine which end-user is associated with which multicast manager. In this case end-user A is associated with multicast manager MM1. Thus, multicast manager MM1 sends the message as well as an end-user recipient sub-list {A} to multicast server MS1, which sends the message to end-user A. The multicast manager MM1 also sends the message and an end-user recipient sub-list {G,H} to multicast manager MM3 on interconnecting line L13, which forwards this information to multicast server MS3, which in turn distributes the message to end-users G and H. In this example multicast manager MM2 is not used, since end-users D,E are not in the end-user recipient list.

It is also noted that end-users C and D did not receive any of the example messages in FIGS. 3 and 4. This is a further illustration of the multicasting feature that typically only proper subsets of the gaming domain end-user set will receive messages.

Figure 5:
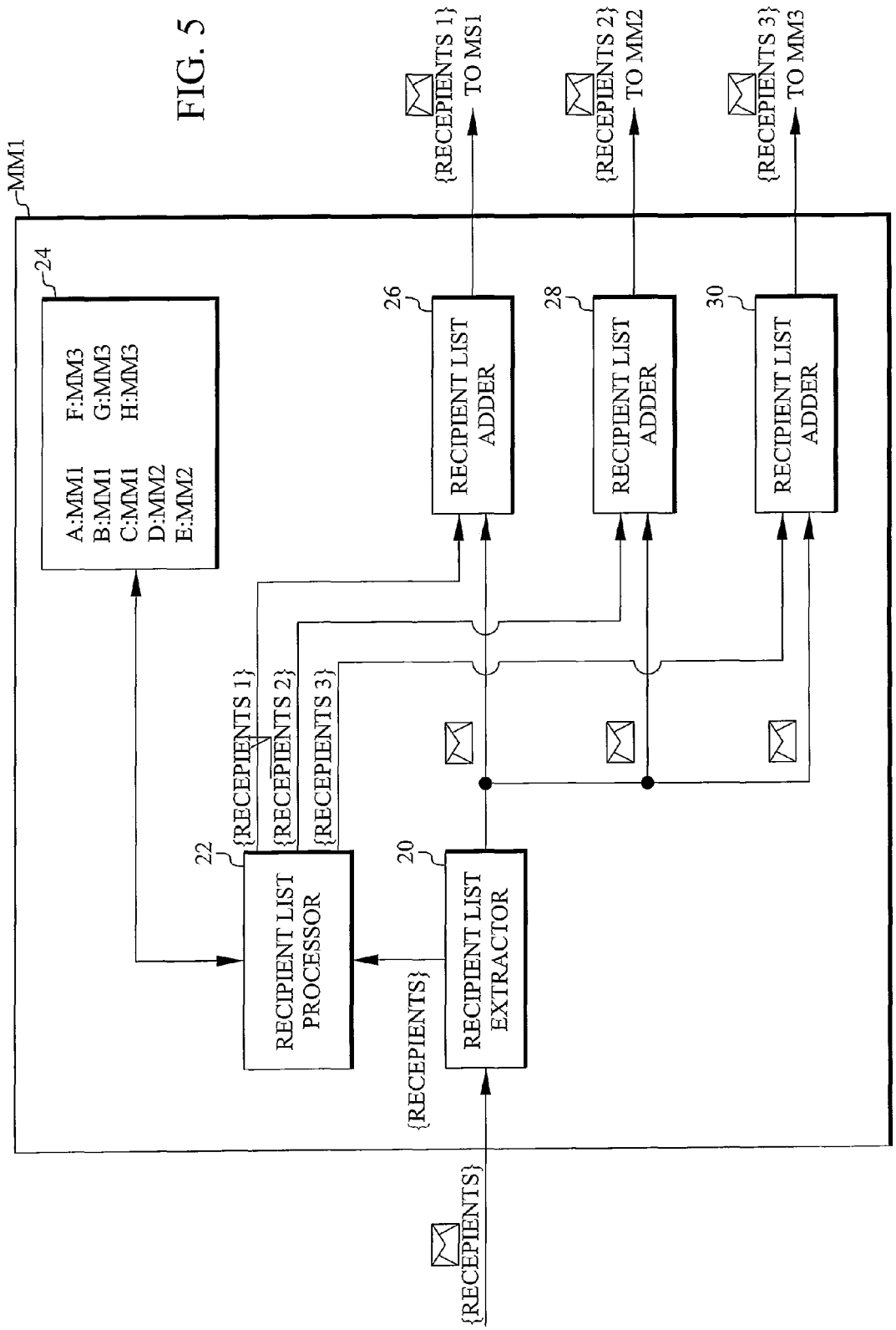
FIG. 5 is a block diagram illustrating an embodiment of a multicast manager.

FIG. 5 is a block diagram illustrating an embodiment of a multicast manager, for example multicast manager MM1 in FIG. 2-4. A message and its associated end-user recipient list received by the multicast manager are forwarded to a recipient list extractor 20, which extracts the list and forwards it to a recipient list processor 22. This processor is connected to a memory 24 storing a table with the identities A-F of connected end-users and their associated multicast managers (or equivalently, their associated multicast servers). Recipient list processor 22 compares the recipients of the received end-user recipient list to the stored table and forms 3 end-user recipient sub-lists, which are forwarded (if not empty) to respective recipient list adders 26, 28, 30, where they are added to the message and sent to multicast server MS1, multicast manager MM2 and multicast manager MM3, respectively.

The functionality described with reference to FIG. 5 is implemented in each multicast manager. In particular each multicast manager will include a copy of the table in memory 24. The content this of table is updated as end-users are connected to and disconnected from the multicast servers.

Although the multicast managers and multicast servers have been illustrated as separate elements, they may also be integrated as a single unit.

In summary, the multicast service system described above will employ a multicast manager internally to keep track of which end-users that are connected to which multicast server. Each multicast manager is coupled to a single multicast server that manages the actual end-user communication. As an event is sent to the multicast service, it will be routed to a single multicast manager, preferably through a load balancer, for processing. The subsequent process can be described by the following steps:
1. Iterate through the end-users recipient list.
2. For each recipient, resolve which multicast server the end-user is connected to.

3. Forward the messages to the associated multicast server together with the relevant recipient sub-list of end-users that are connected locally (unless the sub-list is empty).
4. If there are remaining recipients connected to other multicast servers, build an end-user recipient sub-list for each of these multicast servers.
5. Forward the message and each end-user recipient sub-list to the peer multicast manager(s).

In effect, this process will divide the distribution work among the available multicast servers and make sure that all recipient end-users are reached regardless of where they are connected.

The functionality of the multicast service system of the present invention is typically based on micro processor systems running corresponding software.

The scalability aspect of the present invention is similar to the solution commonly applied to solve the broadcasting problem described above. Servers are arranged in a tree structure where messages are distributed from the root (the source of messages) to the leaves (where end-users connect). Each leaf can only accept a limited number of end-user connections, but scalability can still be achieved by adding more leaves (multicast manager/server pairs). The main difference compared to the broadcast solution is that the multicast mechanism must also be able to send messages to a restricted set of end-users. This implies that the game server that initiates distribution of a multicast message must also provide a recipient list of end-users.

As described above, the present invention decouples the multicast mechanism from the game servers and introduces a new multicast service in a layer between the game servers and the end-users. This solution will keep the gaming logic clean from infrastructural concerns such as the transport mechanism(s) used to communicate with end-users. Furthermore it allows the multicast mechanism to scale as the number of receivers grows by fanning out the communication over several multicast manager/server pairs.

The multicast servers are responsible for managing the end-user connections. Apart from the actual distribution of messages this also means that the multicast servers abstract the transport mechanism used to communicate with the end-users. This effectively relieves the game servers from this responsibility and allows the game servers to manage all end-users in the same way regardless of whether the end-user is connected through a mobile phone, desktop client or is playing from the web.

Furthermore, the multicast servers can be designed and optimized for efficient IO performance without having to consider game logic as well. Consequently, the game servers can be optimized for rule processing capability. It should also be noted that the two types of servers; games servers and multi-cast servers, may now also scale separately. The number of game servers in use is relative to the amount of rule processing performance required. The number of multicast manager/server pairs in use is relative to the number of connected clients. The result is a more cost effective solution that consumes less hardware resources per end-user when scaling to meet the demands of a growing customer base.

It will be understood by those skilled in the art that various modifications and changes may be made to the present invention without departure from the scope thereof, which is defined by the appended claims.

The invention claimed is:

1. An online gaming multicast service system, including:
    a set of interconnected multicast managers for receiving messages from game servers to end-users, each message and an associated end-user recipient list being received by one of the multicast managers;
    a set of multicast servers, one multicast server being connected to each multicast manager, for distributing each message to all end-users in the associated end-user recipient list;
    each multicast manager including:
        a recipient list processor for determining which recipients in an end-user recipient list associated with a message are connected to which multicast server and dividing the end-user recipient list into corresponding end-user recipient sub-lists, and
    means for forwarding the message and non-empty end-user recipient sub-lists to the respective multi-cast servers for further distribution of the message to the end-users in each non-empty end-user recipient sub-list, and
    a memory for storing a table associating each end-user with a multicast manager/server pair to which it is connected;
    wherein the recipient list processor is configured to determine the end-user recipient sub-lists using the received end-user recipient list and the table.

2. The system of claim 1, wherein the game servers are connected to the multicast managers through a load balancer.

3. An online gaming multicast service system, the system comprising:
    a set of interconnected multicast managers for receiving messages from game servers to end-users, each message and an associated end-user recipient list being received by one of the multicast managers; and
    a set of multicast servers, one multicast server being connected to each multicast manager, for distributing each message to all end-users in the associated end-user recipient list;
    wherein each multicast manager includes:
        a memory configured to store a table associating each end-user with a multicast manager/server pair to which it is connected, and
        a recipient list processor configured to determine which recipients in an end-user recipient list associated with a message are connected to which multicast server, and divide the end-user recipient list into corresponding end-user recipient sub-lists,
        wherein the recipient list processor is configured to determine the end-user recipient sub-lists using the received end-user recipient list and the table, and
        wherein the multicast manager is configured to forward the message and non-empty end-user recipient sub-lists to the respective multi-cast servers for further distribution of the message to the end-users in each non-empty end-user recipient sub-list.

4. The system of claim 3, wherein the game servers are connected to the multicast managers through a load balancer.

* * * * *